(12) United States Patent
Imai (10) Patent No.: US 8,638,648 B2
(45) Date of Patent: Jan. 28, 2014

(54) INFORMATION ERASING DEVICE AND INFORMATION ERASING METHOD

(75) Inventor: Mitsugu Imai, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 13/091,537

(22) Filed: Apr. 21, 2011

(65) Prior Publication Data

US 2011/0305124 A1  Dec. 15, 2011

(30) Foreign Application Priority Data

Jun. 15, 2010  (JP) .................................. 2010-136424

(51) Int. Cl.
*G11B 7/00* (2006.01)

(52) U.S. Cl.
USPC ...................... 369/47.5; 369/47.13; 369/30.05

(58) Field of Classification Search
USPC .......... 369/13.04, 13.25, 13.26, 30.12, 30.21, 369/47.5, 47.51, 59.11, 100, 116, 30.05
See application file for complete search history.

(56) References Cited

U.S. PATENT DOCUMENTS

| | | | | |
|---|---|---|---|---|
| 4,695,993 A | * | 9/1987 | Takagi et al. ................ | 369/53.2 |
| 4,774,700 A | * | 9/1988 | Satoh et al. ................ | 369/47.14 |
| 4,825,419 A | * | 4/1989 | Ohtomo ..................... | 369/47.54 |
| 4,833,663 A | * | 5/1989 | Satoh et al. ................ | 369/30.21 |
| 5,404,357 A | * | 4/1995 | Ito et al. .................... | 369/44.27 |
| 5,805,564 A | * | 9/1998 | Kobayashi et al. ......... | 369/275.3 |
| 5,937,427 A | * | 8/1999 | Shinagawa et al. .......... | 711/113 |
| 7,453,780 B2 | | 11/2008 | Ogawa et al. | |
| 2002/0031055 A1 | * | 3/2002 | Nishino et al. ............. | 369/13.04 |
| 2005/0088944 A1 | * | 4/2005 | Shoji et al. ................. | 369/59.25 |
| 2007/0047395 A1 | * | 3/2007 | Skeeter et al. ............. | 369/30.04 |
| 2008/0106985 A1 | * | 5/2008 | Hasebe et al. .............. | 369/47.5 |
| 2008/0239886 A1 | * | 10/2008 | Ito et al. .................... | 369/30.01 |
| 2011/0022793 A1 | * | 1/2011 | Gaspard ....................... | 711/112 |

FOREIGN PATENT DOCUMENTS

| | | |
|---|---|---|
| JP | 62-298072 | 12/1987 |
| JP | 2006-48763 | 2/2006 |

* cited by examiner

*Primary Examiner* — Thang Tran
(74) *Attorney, Agent, or Firm* — Oblon, Spivak, McClelland, Maier & Neustadt, L.L.P.

(57) ABSTRACT

An information erasing device includes a recording section where recording is performed with regard to a disk-shaped recording medium, and a control section which controls the recording section so that the recording section overwrites a part of a erasing target sector so as not to overlap in a radius direction of the disk-shaped recording medium.

9 Claims, 9 Drawing Sheets

INFORMATION ERASING DEVICE AND INFORMATION ERASING METHOD

BACKGROUND

The present disclosure relates to an information erasing device and an information erasing method where information recorded on a disk-shaped recording medium is erased, and in particular, which is appropriate to be applied when information recorded on a so-called recordable disk-shaped recording medium is erased.

As the technique for recording and reproducing digital data, for example, there is a data recording technique using an optical disc (including a magneto-optical disc) such as a CD (Compact Disc), a MD (Mini-Disc), a DVD (Digital Versatile Disc), a BD (Blu-ray Disc: registered trademark), or the like, as a recording medium. The optical disc is an all-inclusive term for disk-shaped recording media where reading out of recorded information is performed using the laser beam.

In the optical discs, for example, there are read-only types known as CDs, CD-ROMs, DVD-ROMs, and the like and types where user data is recordable known as MDs, CD-Rs, CD-RWs, DVD-Rs, DVD-RWs, DVD+RWs, DVD-RAMS, BD-Rs, BD-REs, and the like. The recordable type is able to record data using a magneto-optical recording method, phase change recording method, a dye film change recording method, or the like.

Out of the methods, the dye film change recording method and the like are referred to as so-called write-once recording methods, it is possible to perform data recording only once, and rewriting of data is not possible. The optical discs which correspond to the write-once recording methods are referred to as write-once type or recordable optical discs.

Here, with regard to write-once type optical discs, different to the case of optical discs where rewriting is possible, it is extremely difficult to overwrite and erase the recorded information. This is because, in the case of the write-once type optical discs, the recording film is damaged when the laser beam is radiated with the recording power to a target portion to erase the recorded information, and access to the vicinity thereof is extremely difficult. In other words, there may be cases where, since it is difficult to access the vicinity portion thereof, as a result, more data is lost than is necessary.

Due to the situation described above, data erasing in the write-once type optical discs is performed by dealing with the data as if it were erased by updating of management information using the file management system.

However, when using the method such as this, the data is not actually erased but still exists, and for example, it is possible to fraudulently obtain the data by performing reading out and the like which ignores the management information.

The situation becomes critical in a case where the data is, for example, related to private information or confidential information.

Here, the occurrence of a problem due to the erasing by overwriting as described previously is that all of the data which is the erasing target is overwritten. Therefore, in light of this, in regard to the erasing method of the write-once type optical discs, there is a way of thinking whereby all of the data which is the erasing target is not set as a target to be overwritten but only a partial sector of the data, which is sufficient so that data reproduction of the target sector is not possible, is overwritten and erased.

For example, in the disclosure disclosed in Japanese Unexamined Patent Application Publication No. 62-298072, a method is disclosed where, in a recordable optical disc where address information is recorded in a region of a narrow sector on a disc (address recording position 1$a$) and data is recorded in another region (information recording position 1$b$), reproduction is not possible with regard to information for which reproduction has been forbidden due to a dummy signal being recorded on the recording of the address information which corresponds to the information for which reproduction has been forbidden.

In this manner, through the reading out of the address information being not possible, it becomes possible for the reading out of the data which is the erasing target to be not possible without erasing by overwriting all of the data which is to be erased, and it is possible to simulate the erasing of all of the target data.

SUMMARY

However, in the method where the simulation of erasing is performed such as is disclosed in Japanese Unexamined Patent Application Publication No. 62-298072 described above, in a case where the data which is the erasing target is recorded over a plurality of times around a disc, the portion which is overwritten and erased is formed in a concentrated manner.

Since the portion which is overwritten and erased as described above becomes a portion where the recording film is damaged, it is hardly possible to obtain any reflected beam at that portion, and accordingly, it is not possible to appropriately obtain a servo error signal or the like. That is, using the method disclosed in Japanese Unexamined Patent Application Publication No. 62-298072 described above, since the portion, where a servo error signal is not able to be obtained, still exists in a concentrated manner, there is concern that a period, when a focus servo is separated during a seek operation or a traverse signal is not able to be obtained, may be extended to be a long period, and as a result, there is a possibility of it being extremely difficult to stably perform the seek operation.

It is desirable that there is a configuration as below as an information erasing device.

That is, an information erasing device of an embodiment of the disclosure is provided with a recording section where recording is performed with regard to the disk-shaped recording medium.

In addition, the information erasing device is provided with a control section which controls the recording section so that the recording section overwrites a part of a erasing target sector so as not to overlap in a radius direction of the disk-shaped recording medium.

In the embodiment of the disclosure as described above, the overwriting a part of a erasing target sector so as not to overlap in a radius direction of the disk-shaped recording medium is performed.

In this manner, in a case where erasing is performed by overwriting with regard to a recordable disk-shaped recording medium, it is possible to effectively prevent the portion which is overwritten and erased from being formed in a concentrated manner even in a case where the erasing target data spans several times around the disc.

According to the embodiment of the disclosure, in the case where erasing is performed by overwriting with regard to the recordable disk-shaped recording medium, it is possible to effectively prevent the portion which is overwritten and erased from being formed in a concentrated manner even in the case where the erasing target data spans several times around the disc. In this manner, it is possible to achieve stabilization of the seek operation.

DETAILED DESCRIPTION OF EMBODIMENTS

Below, the embodiments of the disclosure will be described in the following order.
1. Disk-shaped Recording Medium as Target of Embodiment
2. Internal Configuration of Embodiment of Information Erasing Device
3. Erasing Method of the First Embodiment
4. Process Sequence
5. Erasing Method of the Second Embodiment
6. Process Sequence
7. Modified Example

1. Disk-Shaped Recording Medium as Target of the Embodiment

First, a disk-shaped recording medium which is a target of an embodiment will be described.

The disk-shaped recording medium which is a target of an embodiment is an optical disc which is referred to as a so-called BD (Blu-ray Disc: registered trademark) and is a write-once type (recordable type) optical disc where data recording is possible only once. Below, the disk-shaped recording medium which is a target of an embodiment will be referred to as an optical disc D.

Physical parameters of the optical disc D of the embodiment, for example, are as below.

First, as the disc size, the diameter is approximately 120 mm and the disc thickness is approximately 1.2 mm. That is, when viewing the external form, it is the same as a disc of a CD (Compact Disc) format or a disc of a DVD (Digital Versatile Disc) format.

In addition, as a laser beam for recording and reproduction, so-called a violet-blue beam light is used, and approximately 23 GB (gigabytes) to 25 GB is realized as a user data capacity in the disc with the 120 mm diameter by realizing an optical system with a high NA (for example, NA=0.85) as well as a narrow track pitch (for example, track pitch=0.32 μm), a high line density (for example, recording line density of 0.12 μm), and the like.

In addition, a so-called two-layer disc have also been developed where there are two layers of recording layers, and in a case of two layers, the user data capacity is approximately 50 GB.

Figure 1:
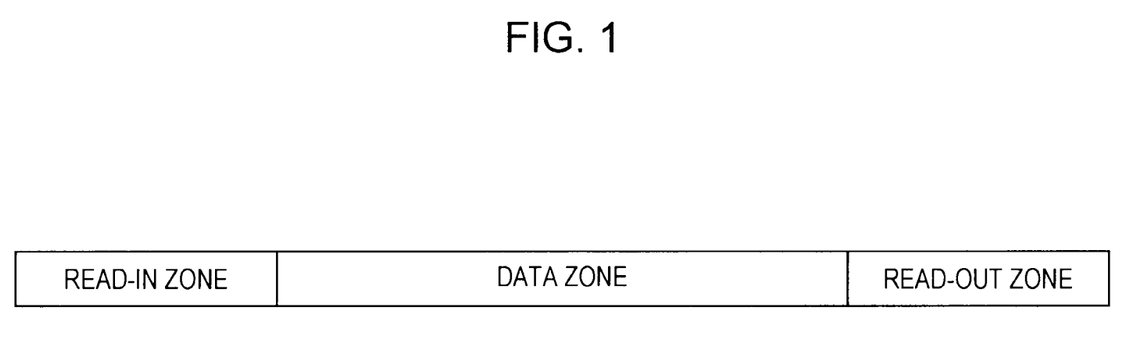
FIG. 1 is an explanatory diagram of an area configuration of a disk-shaped recording medium which is a target of an embodiment of the disclosure.

FIG. 1 shows a layout (area configuration) of the entire optical disc D.

Here, in a system of the example, the layout of FIG. 1 is formed by a disc formatting (initialization) process. In addition, below, as an example, an example of a case where the optical disc is a single layer disc (SL) will be described.

As the area on the disc, from an inner circumference side, there is a read-in zone, a data zone and a read-out zone.

In addition, when looking at the area configuration relating to recording and reproduction, a prerecorded information area PIC in an innermost circumference side of the read-in zone is a read-only area, and from a management area of the read-in zone to the read-out zone is a write-once area where one recording is possible.

In the read-only area and the write-once area, a recording track using a wobbling groove is formed in a spiral formation. The groove is a tracking guide when tracing using a laser spot as well as the groove being a recording track and the recording and reproduction of data being performed.

Here, in the example, an optical disc where data recording is performed in the groove is assumed, but the disclosure is not limited to the optical disc with groove recording such as this, and it is possible to be applied to an optical disc with a land recording format where data is recorded in a land between grooves, or to be applied to an optical disc with a land-groove recording format where data is recorded in the groove and the land.

In addition, the groove which is the recording track has a wobbling shape in response to a wobble signal. As a result, in a disc driver device with regard to the optical disc, the position of both edges of the groove is detected from the reflected beam of the laser spot irradiated onto the groove, and it is possible to reproduce the wobble signal by extracting a fluctuation component of the position of both edge in the disc radius direction when the laser spot is moved along the recording track.

In the wobble signal, address information (physical address, other additional information, or the like) of the recording track of the recording position is modulated. As a result, in the device side, it is possible to perform address control or the like when recording or reproducing the data by the address information and the like from the wobble signal being demodulated.

The read-in zone shown in FIG. 1 is, for example, an area further to an inner side than a 24 mm radius.

In addition, the 22.2 mm radius to 23.1 mm radius in the read-in zone is the prerecorded information area PIC.

In the prerecorded information area PIC, disc information such as recording and reproduction power conditions, area information on the disc, information used in copyright protection, is recorded in advance as read-only information using the wobbling of the groove. Here, the information such as this may be recorded using an embossed pit or the like.

Here, while not diagrammatically shown, there is a case where a BCA (Burst Cutting Area) is provided further to an inner circumference side than the prerecorded information area PIC. The BCA is the recording of a unique ID which is unique to the optical disc D in a recording format where the recording layer is burnt off. That is, recording data in a barcode format is formed by forming a recording mark so as to line up concentrically.

In the read-in zone, for example, the range from a 23.1 mm radius to a 24 mm radius is a management/control information area.

In the management/control information area, a predetermined area format is set which has a control data area, a DMA (Disc Management Area), a test write area, a buffer area, and the like.

In addition, the outer circumference side of the data zone, for example, a 58.0 mm radius to a 58.5 mm radius, is the read-out zone. The read-out zone is the management/control information area, and the control data area, the DMA, the buffer area, and the like are formed with a predetermined format. In the control data area, each type of management/control information is recorded, for example, in a similar manner to the control data area of the read-in zone. The DMA is prepared as an area where management information is recorded in a similar manner as the DMA of the read-in zone.

In the data zone, user data is recorded. In a erasing method of each embodiment to be described later, the data which is the erasing target is specified mainly from out of the recording data of the data zone.

In the optical disc D of the example, the smallest unit of recording and reproduction in the data zone is a "cluster" unit. The cluster substantially matches with a RUB (Recording Unit Block) in the BD.

In addition, the cluster is physically a fixed length. The cluster length is set as a length so that two of the clusters are able to be contained in the one track of the innermost circumference portion. In this case, since a CLV (Constant Linear Velocity) method is adopted as a disc rotation method, there is a trend where the number of clusters included in one track (one track loop) gradually increases toward the outer circumference side. In the case of the BD, the number of clusters in one track is five in the portion which is finally on the outer circumference.

2. Internal Configuration of Information Erasing Device of the Embodiment

Next, the internal configuration of the information erasing device of the embodiment will be described using FIG. 2.

Here, the information erasing device of the embodiment has a recording function and a reproduction function with regard to the optical disc D. With this meaning, below, the information erasing device of the embodiment is referred to as an information erasing device 1.

Figure 2:
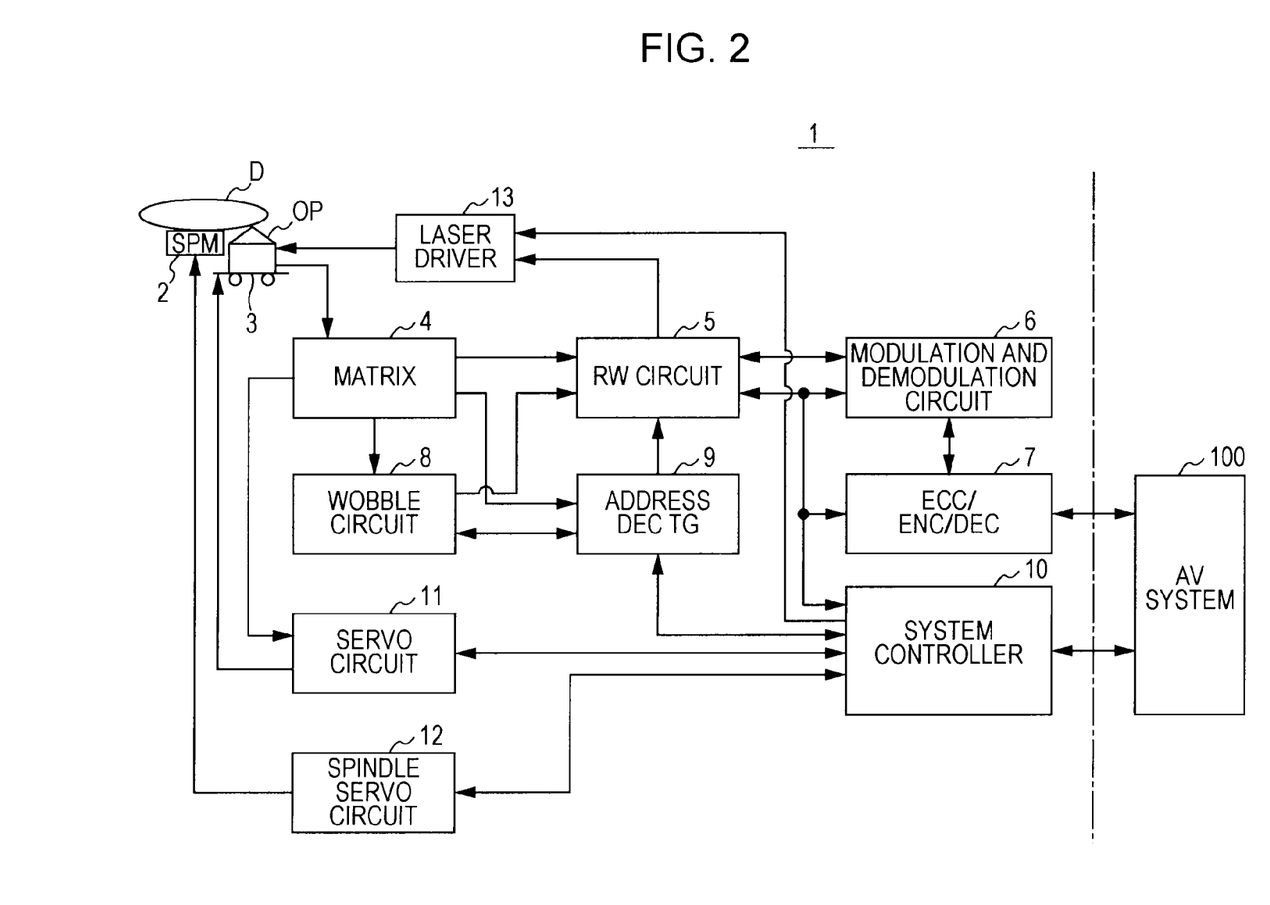
FIG. 2 is a block diagram illustrating an internal configuration of an information erasing device according to an embodiment of the disclosure.

In FIG. 2, the optical disc D is mounted into a turn table (not shown) and is rotatably driven at a constant line velocity (CLV) using a spindle motor (SPM) 2 during a recording or a reproduction operation (or during a erasing operation which will be described later).

Then, the reading out of ADIP information, which is embedded as a wobbling in the groove on the optical disc D, is performed using an optical pickup (optical head) OP.

In addition, during recording, the user data is recorded as a mark in the track using the optical pickup OP, and during reproduction, the reading out of the data recorded by a mark using the optical pickup OP is performed.

In the optical pickup OP, a laser diode serving as a light source, a photo detector for detecting reflected beam, a field lens which is an output end of the laser beam, and an optical system, where the laser beam is radiated on a recording surface of the optical disc D via the field lens and the reflected beam is guided to the photo detector, are formed.

In the optical pickup OP, the field lens is held so as to be able to move in a tracking direction and a focus direction using a biaxial mechanism.

In addition, the entire optical pickup OP is able to move in the disc radius direction using a thread mechanism 3 in the diagram.

In addition, the laser diode in the optical pickup OP is driven to emit a laser beam by a drive signal (drive current) from a laser driver 13.

In addition, in the optical pickup OP, a spherical aberration mechanism for correction the spherical aberration of the laser beam is provided and spherical aberration correction is performed due to control of a servo circuit 11 which will be described later.

Reflected beam information from the optical disc D is detected by the photo detector, is made to an electric signal corresponding to a received light amount, and is supplied to a matrix circuit 4.

In the matrix circuit 4, a current/voltage conversion circuit, a matrix calculation/amplification circuit, and the like are provided corresponding to an output current from a plurality of light receiving elements as the photo detector and a necessary signal is generated using matrix calculation processing.

For example, a high frequency signal (data reproduction signal or RF signal) which is equivalent to the reproduction data, a focus error signal for servo control, a tracking error signal, and the like are generated.

Furthermore, a signal relating to the wobbling of the groove, that is, a push-pull signal as a signal which detects the wobbling (a wobble amplitude), is generated.

The data reproduction signal which is output from the matrix circuit 4 is supplied to a reader/writer (RW) circuit 5, a focus error signal and a tracking error signal are supplied to the servo circuit 11, and a push-pull signal is supplied to a wobble circuit 8.

The reader/writer circuit 5 performs a binarization process with regard to the data reproduction signal (RF signal), a reproduction clock generation processing using the PLL (Phase Locked Loop) and the like are performed, and a binary data row is obtained with regard to a signal which is recorded on the optical disc D. The binary data row is supplied with regard to a modulation and demodulation circuit 6.

The modulation and demodulation circuit 6 has been given a function as a decoder during reproduction and a function as an encoder during recording.

As a decoding process during reproduction, a demodulation process of the run length limiting code is performed based on the reproduction clock. In addition, during the decoding process, detection of a sync pattern embedded in a cycle in the recording data of the optical disc D is also performed. The sync signal which represents detection timing of the sync pattern is supplied to each necessary section of an ECC encoder/decoder 7 and the like which is described below. For example, the sync signal is also supplied to the reader/writer circuit 5 to be used in PLL lock determination. In addition, the sync signal is also supplied to a system controller 10.

The ECC encoder/decoder 7 performs an ECC encoding process where an error correction code is attached during recording and an ECC decoding process where error correction is performed during reproduction. During reproduction, the data which is demodulated by the modulation and demodulation circuit 6 is input into an internal memory (not shown), error detection/correction processing, deinterleaving, and the like are performed, and reproduction data is obtained.

The data which has been decoded to be reproduction data by the ECC encoder/decoder 7 is read out based on an instruction of the system controller 10 and transferred to an AV (Audio-Visual) system 100.

The push-pull signal which is output from the matrix circuit 4 as a signal relating to the wobbling of the groove is processed in the wobble circuit 8. The push-pull signal as the ADIP information is demodulated to a data stream which configures an ADIP address in the wobble circuit 8 and is supplied to an address decoder 9.

The address decoder 9 performs decoding with regard to the supplied data and obtains an address value, and the address value is supplied to the system controller 10.

In addition, the address decoder 9 generates a clock using PLL which uses the wobble signal supplied from the wobble circuit 8 and supplies the clock, for example, to each section as an encoding clock during recording.

During recording, recording data is transmitted from the AV system 100, but the recording data is sent to a memory in the ECC encoder/decoder 7 described above and buffered.

In this case, the ECC encoder/decoder 7 performs addition of the error correction code and the addition of interleaving, sub code, or the like as an encoding process of the buffered recording data.

In addition, the ECC encoded data is subject to a predetermined run length limit coding process (modulation process) such as a RLL (1-7) PP method in the modulation and demodulation circuit 6 and is supplied to a reader/writer circuit 5.

During recording, the encoding clock which is a standard clock for these encoding processes is used as a clock generated from the wobble signal described above.

The recording data generated by the encoding process is sent to the laser driver 13 as a laser drive pulse after precise adjustment of the optimal recording power with regard to the recording layer characteristics, the spot shape of the laser beam, the recording line velocity, and the like, adjustment of the laser drive pulse waveform, and the like as the recording compensation process by the reader/writer circuit 5.

In the laser driver 13, the supplied laser drive pulse is applied to the laser diode in the optical pickup OP described above and laser beam emission driving is performed. According to this, the mark according to the recording data in the optical disc D is formed.

Here, with regard to the laser driver 13, a so-called APC (Auto Power Control) circuit is provided, output of the laser is controlled so as to be constant irrespective of the temperature or the like while laser output power is monitored using the output of a detector (front monitor) for monitoring laser power which is provided in the optical pickup OP.

A target value (write power and read power) of the laser output during recording and during reproduction is applied from the system controller 10, and the respective laser output levels during recording and during reproduction are controlled to be the target values.

The servo circuit 11 generates each type of focus, tracking, and thread servo drive signals from the focus error signal and the tracking error signal from the matrix circuit 4, and a servo operation is executed.

That is, a focus drive signal and a tracking drive signal are generated in response to the focus error signal and the tracking error signal, and a focus coil and a tracking coil of the biaxial mechanism in the optical pickup OP are driven. According to this, a tracking servo loop and a focus servo loop are formed using the optical pickup OP, the matrix circuit 4, the servo circuit 11, and the biaxial mechanism.

In addition, the servo circuit 11 sets the tracking servo loop to off according to a track jump command from the system controller 10, and a track jump operation is executed by outputting the jump drive signal.

In addition, the servo circuit 11 generates a thread drive signal based on a thread error signal obtained as a low-pass component of the tracking error signal, a seek operation control from the system controller 10, and the like, and the thread mechanism 3 is driven. Although not shown, the thread mechanism 3 has a mechanism which uses a main shaft which supports the optical pickup OP, a thread motor, a transmission gear, and the like, and necessary thread movement of the optical pickup OP is performed by the thread motor being driven in response to the thread drive signal.

In addition, the servo circuit 11 applies a focus bias to the focus servo loop according to a command from the system controller 10.

In addition, the servo circuit 11 supplies a driving signal for spherical aberration correction to the spherical aberration correction mechanism described above in the optical pickup OP according to a command from the system controller 10.

A spindle servo circuit 12 performs control which rotates the spindle motor 2 in a CLV manner. The spindle servo circuit 12 obtains the clock generated in the PLL process with regard to the wobble signal as the current rotational velocity information of the spindle motor 2 and generates a spindle error signal by comparing the clock with predetermined CLV standard velocity information.

In addition, during data reproduction, since the reproduction clock generated using the PLL in the reader/writer circuit 5 (clock which is the decoding process standard) is the current rotational velocity information of the spindle motor 2, it is possible to generate the spindle error signal by comparing the clock with the predetermined CLV standard velocity information. Then, the spindle servo circuit 12 outputs a spindle drive signal which is generated in response to the spindle error signal and rotation of the spindle motor 2 in a CLV manner is executed.

In addition, the spindle servo circuit 12 generates the spindle drive signal in response to a spindle kick/break control signal from the system controller 10 and the operations of the spindle motor 2 such as start-up, stopping, acceleration, deceleration, and the like are also executed.

Each type of operation of the servo system and the recording and reproduction system as above are controlled by the system controller 10 which is configured by a microcomputer.

The system controller 10 executes each type of process according to the commands from the AV system 100. For example, when a write command is output from the AV system 100, the system controller 10 performs seek operation control with the specified address as the target address. That is, the command is output to the servo circuit 11 and an access operation of the optical pickup OP is executed with the address specified by the command as the target. In addition, along with this, the encoding process is executed as described above with regard to the data transferred from the AV system 100 by the ECC encoder/decoder 7 and the modulation and demodulation circuit 6 (for example, video data and audio data of each type of method such as MPEG2). Then, the recording is executed with regard to the optical disc D by the laser drive pulse from the reader/writer circuit 5 being supplied to the laser driver 13 as described above.

In addition, for example, in a case where a read command is supplied which requests the transfer of data from the AV system 100 to be recorded on the optical disc D, first, the seek operation control is performed with the specified address as the target. After that, necessary control is performed for transferring the data of the specified data sector to the AV system 100. That is, with regard to the read out data from the optical disc D, decoding, buffering, and the like are executed in the reader/writer circuit 5, the modulation and demodulation circuit 6, and the ECC encoder/decoder 7, and the requested data is transferred.

Figure 4:
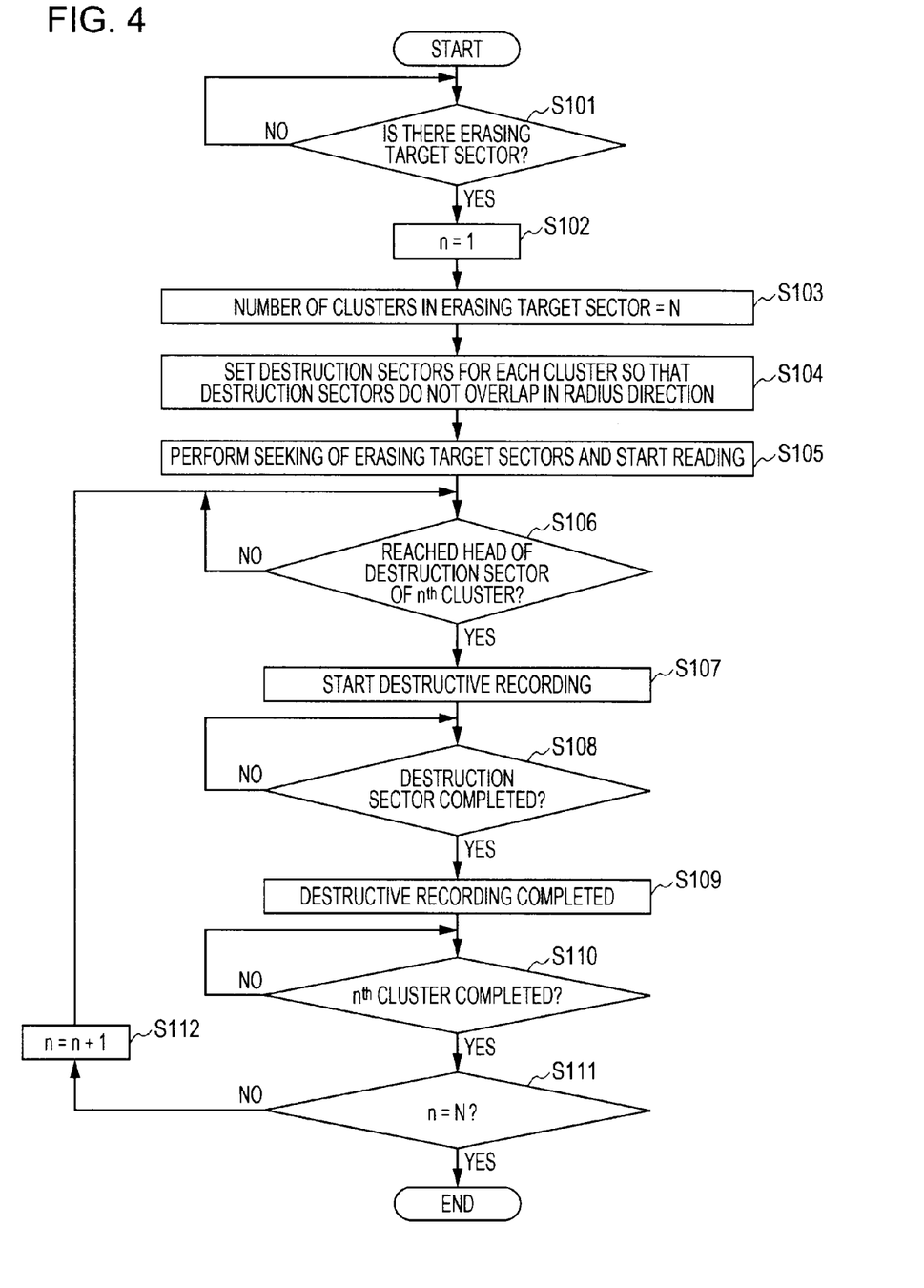
FIG. 4 is a flow chart illustrating a specific process sequence for realizing the erasing method according to the first embodiment.
Figure 6:
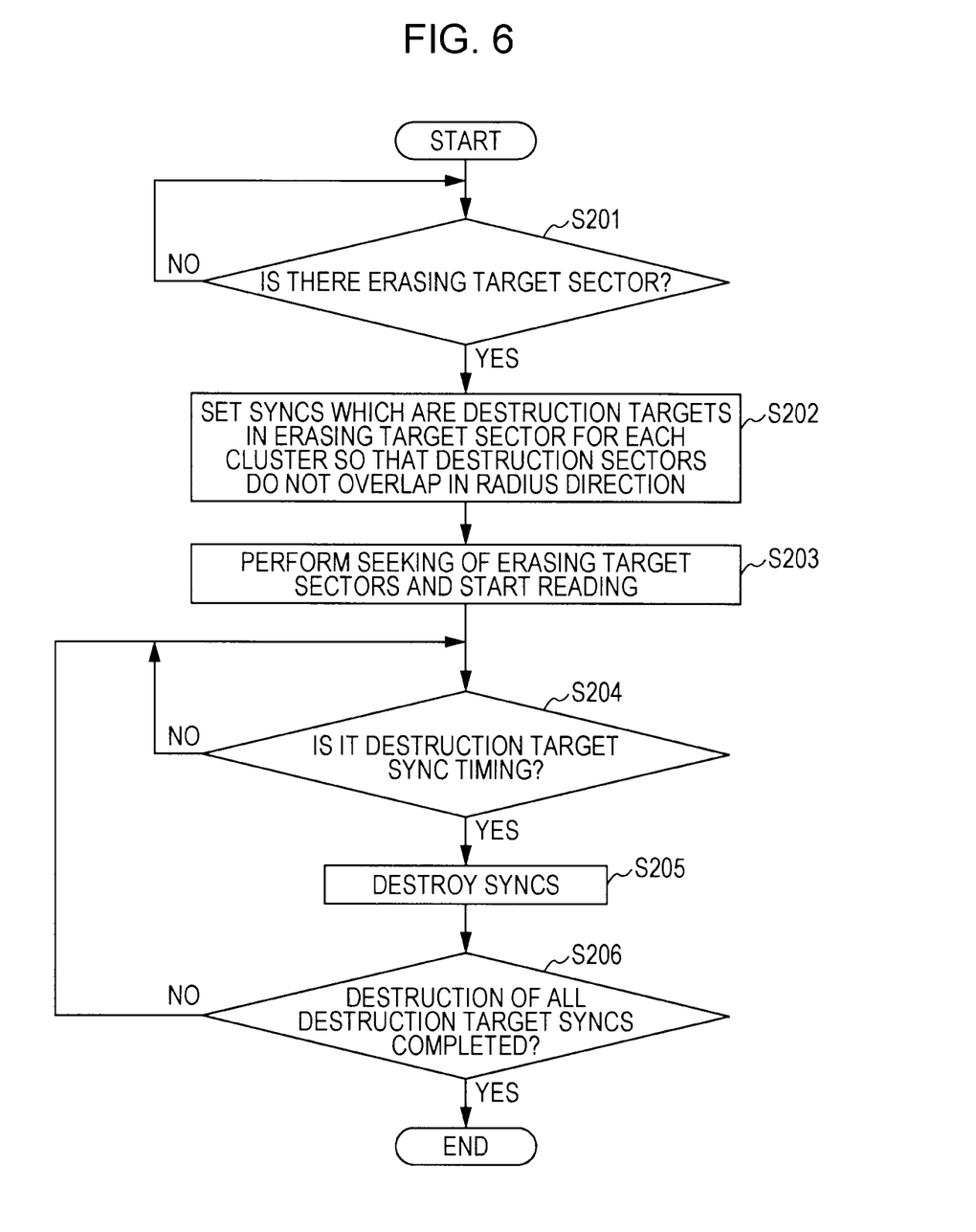
FIG. 6 is a flow chart illustrating a specific process sequence for realizing the erasing method according to the second embodiment.

In addition, the system controller 10 realizes a erasing operation as the embodiment by executing the process operation described in FIGS. 4 and 6, for example, according to the data, which is the erasing target from out of the data recorded on the optical disc D, being specified from the AV system 100 side. This will be described again later.

Here, in the example of FIG. 2, there is a recording and reproduction device 1 which is connected to the AV system 100, but for example, the recording and reproduction device 1 may be connected to a personal computer or the like.

Alternatively, a format of being connected to another apparatus is possible. In this case, the providing of an operation section and a display section and the configuration of the interface section for data input and output will differ from FIG. 2. That is, it is sufficient if the recording and reproduction are performed according to a user operation and a terminal section for the input and output of each type of data is formed.

3. Erasing Method of the First Embodiment

Here, as described previously, when the recording data in a recordable type optical disc such as the optical disc D of the example is to be erased, due to the problems of in a method where the data is treated as having been erased by updating the management information using a file management system, the data actually remains and it is possible to read out the data, when all of the target data, for which the reading of the data which is the target data is to be made to be not possible, is to be erased by being overwritten and recorded on (that is, destroyed), access up to the vicinity thereof is not possible and reproduction is not possible in a range which is more than necessary, there is a valid method where the erasing of data is simulated whereby not all of the data which is the erasing target is destroyed but only a partial sector is destroyed to the extent that the reproduction of the data is not possible.

However, in the case such as where the address recording area, which sets the predetermined position on the disc, is destroyed as in the disclosure disclosed in Japanese Patent Application No. 62-298072 described previously, in the case where the erasing target data is recorded over a plurality of times around the disc, the destroyed locations are concentrated, and as a result, there is a concern that it is not possible to stably perform the seek operation.

Figure 3:
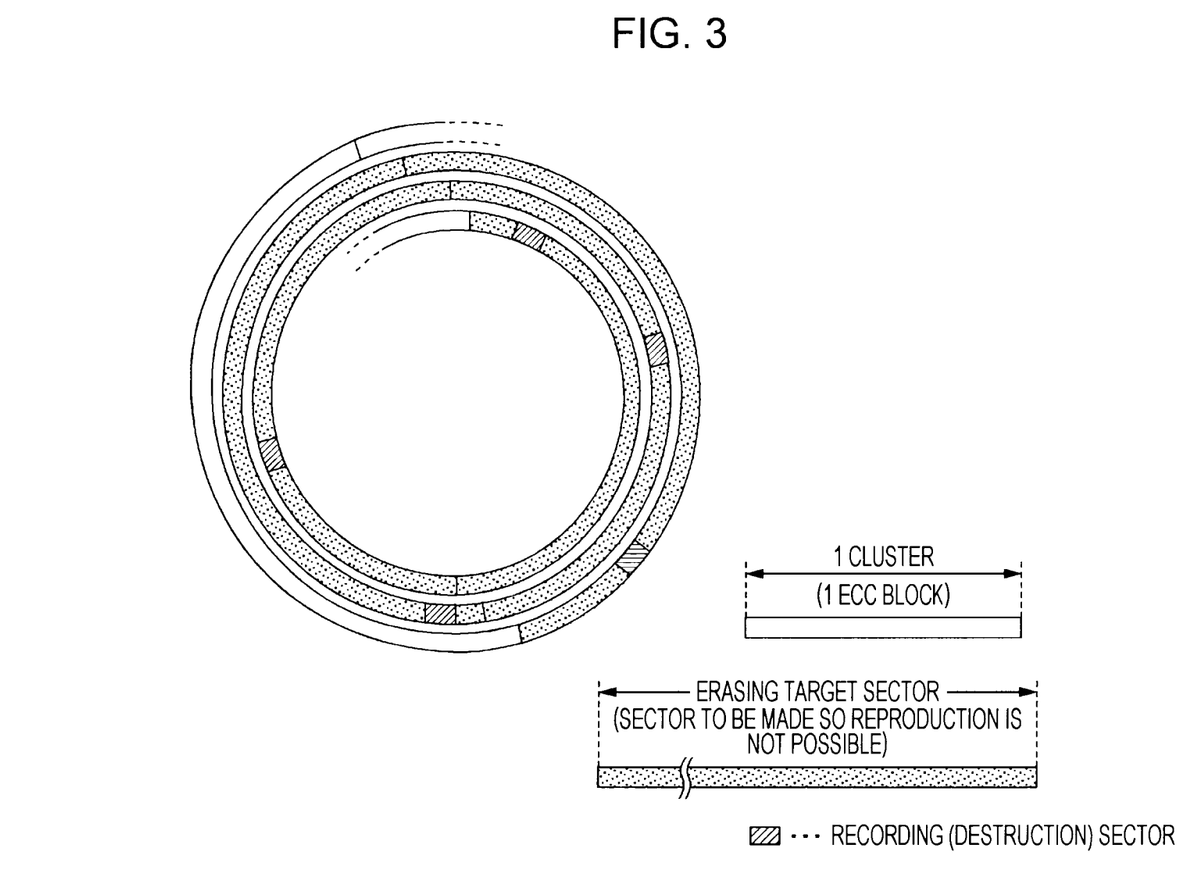
FIG. 3 is an explanatory diagram of an erasing method according to a first embodiment.

Therefore, in the first embodiment, resolution of the problems is achieved by adopting a erasing method such as shown in FIG. 3 next.

First, as an assumption, in the first embodiment, as a specific method where a part of a erasing target sector, which is the sector where the data where reproduction is to be made to be not possible is recorded, is destroyed by being overwritten and recorded on, a method is adopted where a partial sector is destroyed for each cluster included in the erasing target sector.

Here, one cluster (one RUB) matches with one ECC. Accordingly, in one cluster, it is possible to efficiently make the data in the cluster so that it is not possible to be reproduced if only a length of sector is destroyed to the extent that the ECC is not able to be determined.

In light of this point, in the first embodiment, a method is adopted where the entire erasing target sector is made so that it is not possible to be reproduced (that is, erasing is simulated) by a partial sector with the length to the extent that the ECC is not able to be determined being destroyed by being overwritten for each cluster in the erasing target sector.

Here, the "length to the extent that the ECC is not able to be determined" also depends on the adopted method of the error correction process (differences in error correction ability), but for example, is a length (length in a line direction) of approximately 1 mm to 2 mm in the case of a BD and a length of 2 mm is sufficient.

Then, under this assumption, in the first embodiment, an area to be destroyed in each cluster is selected so as not to overlap with each other in the radius direction.

Specifically, in the first embodiment, the system controller 10 sets the destruction target sector in each cluster is set in the specified erasing target sector so that the destruction sectors do not overlap in the radius direction. Then, seeking of the head of the erasing target sector is performed, and then, destructive recording for each cluster is performed at a timing which is the destruction target sector which is set as described above.

In this manner, using the erasing method of the first embodiment, it is possible to effectively prevent the destruction sectors from being formed in a concentrated manner, and as a result, it is possible that the stability of the seek operation is not lost in regard to the disc after erasing.

In addition, as the embodiment, since the destruction of data is performed only with regard to a partial sector and not the entire erasing target sector, it is not possible to access the portions other than the erasing target sector. That is, it is possible to achieve prevention a sector which is more than necessary from being not possible to be reproduced. In other words, it is possible to achieve prevention of the simulated erasing up to the data which is not the erasing target.

4. Process Sequence

The flow chart of FIG. 4 shows a specific process sequence which is performed to realize the erasing method of the first embodiment as described above.

Here, in FIG. 4, a specific process sequence for realizing the erasing method of the first embodiment is shown as a process sequence which is executed by the system controller 10 shown in FIG. 2. The system controller 10 executes the process operation using the sequence shown in FIG. 4 in accordance with a program stored in a memory such as a ROM which is, for example, provided in the system controller 10.

In FIG. 4, in step S101, there is waiting until there is an erasing target sector command. That is, a determination process of whether or not there is an erasing target sector (erasing target data) command from the AV system 100 shown in FIG. 2 is repeatedly executed until there is a command.

Then, in a case where there is an erasing target sector command from the AV system 100, first, in step S102, a cluster count value n is set to "1". Here, as will be made clear from a description later, the cluster count value n is a value for counting the number of clusters where overwriting (destructive recording) is performed.

Next, in step S103, the number of clusters in the erasing target sector is set as N. That is, the value of the number of clusters N, which is included in the erasing target sector where there is a command in step S101, is held.

Then, in the next step S104, the destruction sectors of each cluster are set so that the destruction sectors do not overlap in the radius direction.

Here, in a case where the erasing target sector is specified, the arrangement relationship of each of the clusters in the erasing target sector is determined from the recording format of the disc. Accordingly, in step S104, in regard to each of the clusters where the arrangement relationship is determined in this manner, the selection and setting of the destruction sectors are performed so that each of the destruction sectors do not overlap in the radius direction.

After the destruction sectors are set for each of the cluster in this manner, in step S105, seeking of the erasing target sector is performed and the process for starting reading is executed. That is, a seek operation control is performed with the head address of the erasing target sector as a target and a reading out operation is started using the optical pickup OP.

Next, in step S106, there is waiting until the destruction sector of the $n^{th}$ cluster is reached. Then, in a case where the destruction sector of the $n^{th}$ cluster is reached, in step S107, a process for starting destructive recording is performed. That is, a command with regard to the reader/writer circuit 5 is performed, output of a recording pulse is started using the laser driver 13, and the overwriting (destructive recording) on the disc is started.

In the case of the example, the overwriting is performed using recording of dummy data. As the dummy data, it is possible to give, for example, an 8T-8T repetitive pattern as an example.

The system controller 10 applies the dummy data such as this to the reader/writer circuit 5 and executes the recording of the dummy data.

After the destructive recording is started, in step S108, there is waiting until the destruction sector is completed. Then, in a case where the destruction sector is completed, in step S109, the destructive recording ends. That is, there is returning to a read state.

After the destructive recording ends, in step S110, there is waiting until the $n^{th}$ cluster is completed. That is, there is waiting until the end position of the $n^{th}$ cluster is reached.

Then, in a case where the $n^{th}$ cluster is completed, in step S111, it is determined whether or not n=N. That is, it is determined whether or not the destructive recording has been executed with regard to the destruction sectors in all of the clusters in the erasing target sector.

In a case where a negative result that n=N is not satisfied is obtained in step S111, after progressing to step S112 and incrementing the cluster count value n by one (n=n+1), there is returning to step S106. As a result, the processes of steps S106 to S112 are repeatedly executed until the destructive recording has been completed with regard to the destruction sectors of all of the clusters in the erasing target sector.

On the other hand, in a case where an affirmative result that n=N is obtained in step S111, the series of processes shown in FIG. 4 ends.

5. Erasing Method of the Second Embodiment

Next, a second embodiment will be described.

The second embodiment is where destructive recording is performed with a sync pattern sector which has been periodically inserted into the recording data as a target.

Here, in the second embodiment, the description of the configuration of the information recording device using diagrammatical representation are not included again since the configuration is the same as the case of the first embodiment (the recording and reproduction device 1) described previously in FIG. 2.

Figure 5:
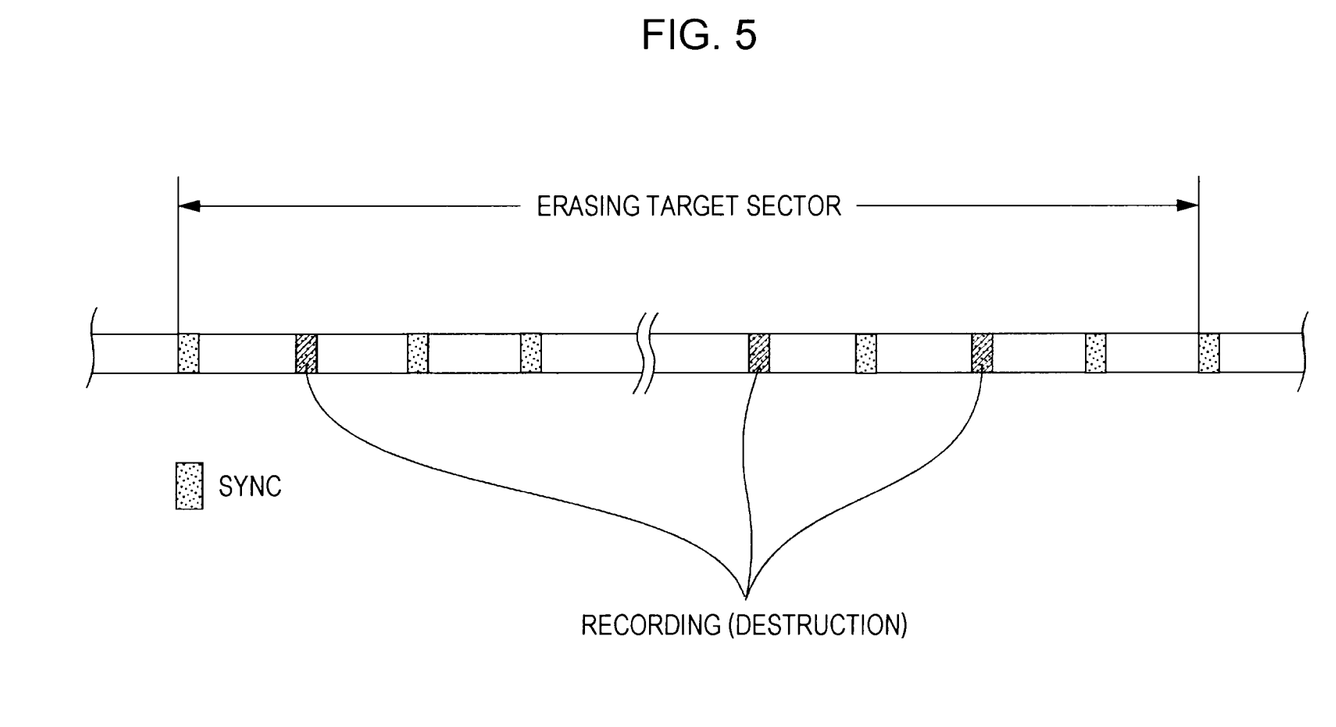
FIG. 5 is an explanatory diagram of an erasing method according to a second embodiment.

FIG. 5 is an explanatory diagram of an erasing method according to a second embodiment.

As shown in FIG. 5, in the second embodiment, a method is adopted where the reproduction of the data in the erasing target sector is made to be not possible by performing destructive recording where a predetermined sync is the target out of the sync pattern in the recording sector (sync in the diagram) which exists in the specified erasing target sector.

At this time, in regard to the sync which is the destruction target, that the syncs are selected so as not to overlap in the radius direction is the same as the case of the first embodiment.

Here, as shown by the recording and reproduction device 1 shown in FIG. 2, normally, in the recording and reproduction device with regard to the optical disk, a method is adopted where continuous detection of a predetermined plurality of sync patterns as a method of PLL lock determination is a necessary condition.

Of course, in a case where a PLL lock is released, the decoding process of the data of the sector using a decoder (which corresponds to the ECC encoder/decoder 7 in FIG. 2) is not carried out, and as a result, the reproduction of the data of the sector is not possible.

In light of this, in the second embodiment, a method is adopted where at least one sync is destroyed for each of the predetermined plurality of syncs in the specified erasing target sector. That is, according to this, the reproduction of the data in the entire erasing target sector is made to be not possible.

Then, with the assumption that the method such as this is adopted, the syncs which are the destruction targets are selection as so to not overlap in the radius direction.

In this manner, since the destruction of data is performed only with regard to a partial sector and not the entire erasing target sector even in the erasing method of the second embodiment, it is possible to effectively prevent the occurrence of the situation where reproduction in a sector which is more than necessary is made to be not possible.

In addition, since the destruction sectors are selected so as not to overlap in the radius direction also in this case, prevention of the destruction sectors being formed in a concentrated manner is achieved, and as a result, prevention of the losing of stability of the seek operation in the disc after erasing is achieved.

6. Process Sequence

The flow chart of FIG. 6 shows a specific process sequence for realizing the erasing method of the second embodiment.

Here, also in FIG. 6, the specific process sequence for realizing the erasing method of the second embodiment shows a process sequence which is executed by the system controller 10 shown in FIG. 2 in accordance with a program stored in a memory or the like which is, for example, provided in the system controller 10.

In FIG. 6, first, in step S201, in the same manner as step S101 of FIG. 4 beforehand, there is waiting until there is the erasing target sector command.

Then, in a case where there is the erasing target sector command, in step S202, the syncs which are the destruction targets in the erasing target sector are set so that the destruction sectors do not overlap in the radius direction.

At this time, the setting of the syncs which are the destruction targets is performed so that at least one sync is selected for each of the "predetermined plurality" of syncs which is a necessary condition of the continuous detection in the PLL lock determination which is described previously.

After the setting of the syncs which are the destruction targets is performed in this manner, in step S203, the process for performing seeking of the erasing target sector and the starting of reading is performed in the same manner as step S105 in FIG. 4 beforehand.

Then, next, in step S204, there is waiting until a destruction target sync timing is reached, and in a case where the destruction target sync timing is reached in step S204, a process for destroying the syncs is performed in step S205. That is, dummy data is applied to the reader/writer circuit 5 and the recording of the dummy data is executed.

In the case of the BD, since the sync pattern is a 9T-9T sector with a total of 18T, the overwriting of the dummy data is executed over the sector length of 18T in step S205.

In step S205, after the process for destroying the syncs is executed in step S205, in step S206, it is determined whether or not the destruction of all of the destruction target syncs is completed.

In a case where a negative result is obtained such that the destruction of all of the destruction target syncs set in step S202 is not completed, there is returning to step S204 beforehand. According to this, the processes of steps S204 to S206 are repeatedly executed until the destructive recording is completed with regard to all of the destruction target syncs.

In addition, in step S206, in a case where an affirmative result is obtained such that the destruction of all of the destruction target syncs has been completed, the processes shown in FIG. 4 end.

Here, in the description above, a case is shown as an example where the erasing method of the second embodiment is realized by setting the destruction target syncs using the system controller 10. However, it is possible to realize the erasing method of the second embodiment using a hardware configuration.

For example, it is possible to realize the erasing method of the second embodiment even providing a circuit (control circuit) which selects the syncs which are the destruction targets based on a random number. Specifically, the providing of a circuit which selects at least one sync to be selected for each of the "predetermined polarity" of syncs described above based on a random number. According to this, it is possible to select the syncs which are destruction targets so as not to overlap in the radius direction.

7. Modified Example

Above, the embodiments of the disclosure have been described, but the disclosure is not limited to the specific examples described up to here.

Here, in practice, a case is considered where data erasing is designated again with regard to the optical disc D where data erasing has been previously designated. Then, in this case, a case is also considered where the sector, where the data which has been newly designated for erasing is recorded, is adjacent to the sector where erasing was previously performed.

In this manner, in a case where the sector, where the data which has been newly designated for erasing is recorded, has an adjacent relationship with regard to an already erased sector, since the processes are executed as described in FIGS. 4 and 6 beforehand, there is a concern that it is not possible that the destruction sectors do not overlap in the radius direction viewed from the overall disc. This is because, in the processes in FIGS. 4 and 6, the sectors which are destroyed are set so as to not overlap in the radius direction only in the specified erasing target sector.

Therefore considering the case such as this, in the case where the sector, where the data which has been newly designated for erasing is recorded, has an adjacent relationship with regard to the already erased sector, the sectors which have already been destroyed in the erasing sector are also included and the destruction target sectors are set so that the destruction sectors do not overlap in the radius direction.

In this manner, also in a case where an erasing command is carried out a plurality of times with regard to the same optical disc D, it is possible to effectively prevent the destruction sectors from being formed in a concentrated manner and prevention of the seek operation becoming unstable is achieved.

Here, in a case where a configuration is adopted where the destruction target sector is selected based on a random number as described previously, since the destruction sectors are selected randomly from the time of second erasing onward, it is possible to effectively prevent the destruction sectors from overlapping in the radius direction even in a case where the sector, where the data which has been newly designated for erasing is recorded, has an adjacent relationship with regard to the already erased sector.

In addition, while not particularly mentioned in the description up until now, when a simulated erasing operation is executed using overwriting, at the same time, the management information using the file management system is also updated and the data is treated as having been erased. According to this, it is possible to treat the data as having been erased also in terms of appearance.

In addition, in the description up to here, the recording of the dummy data is performed as the destructive recording, but the laser beam emission during destructive recording may be DC light emission.

As the method of laser beam emission during destructive recording, a method which is appropriately optimal may be adopted according to the actual configuration such as the applying of APC or the method of gain switching of the photo detector, or the like. For example, a method which is appropriately optimal may be selected according to the characteristics and the like after destruction, such as the stability of the servo during the destructive recording operation and whether the ECC is determined during reading after destruction.

In addition, while the specific control method of laser power during destructive recording has not been mentioned in the description up to here, it is possible to consider APC tracking and adopt the method such as that described below as the control method of the laser power during destructive recording.

Here, first, before the description with regard to the specific control method of the laser power during destructive recording, a configuration relating to the APC of the recording and reproduction device 1 and a configuration relating to gain adjustment of the photo detector in the optical pickup OP will be described using FIG. 7.

Figure 7:
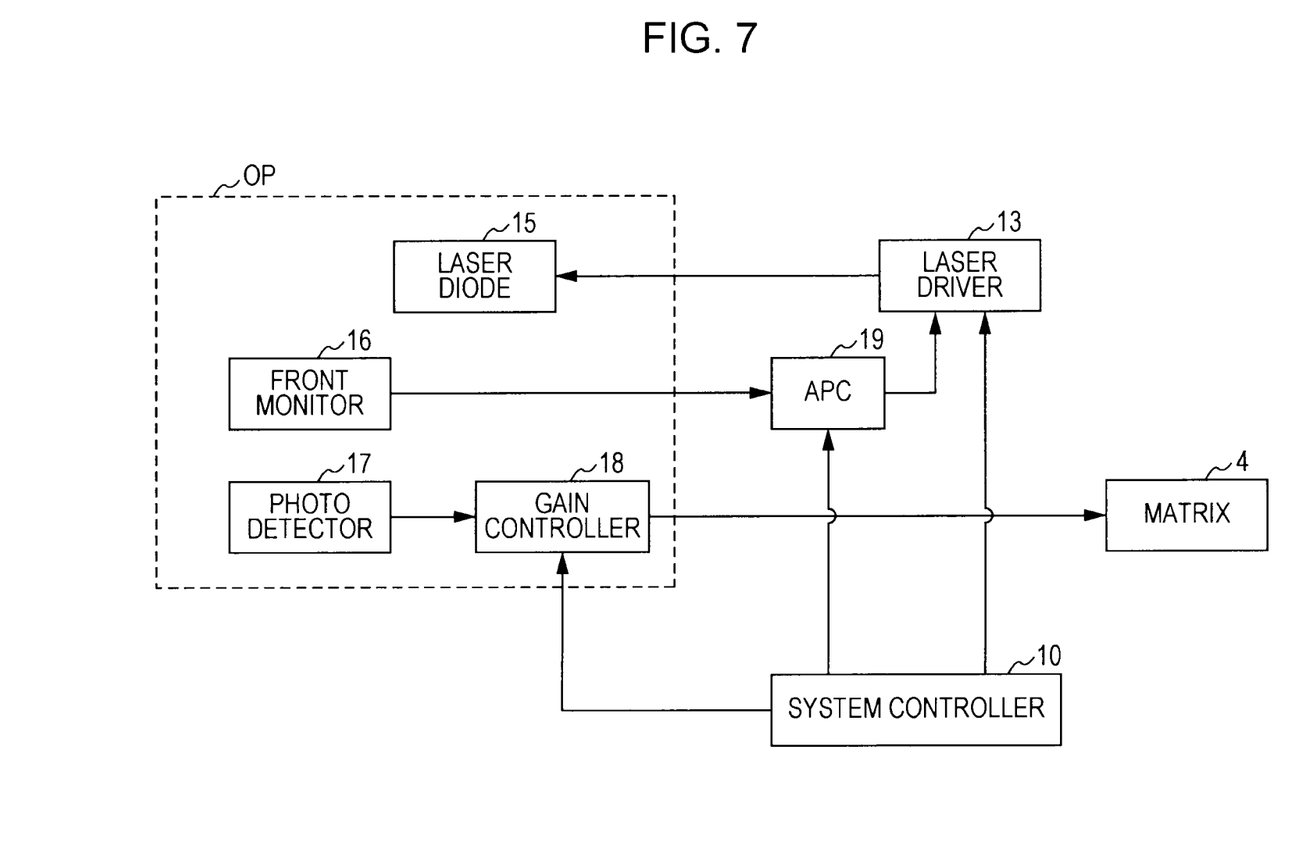
FIG. 7 is an explanatory diagram of a specific configuration relating to gain adjustment of APC and a received light signal.

First, also in FIG. 7, the laser driver 13, the matrix circuit 14, and the system controller 10 shown in FIG. 2 beforehand are shown. In the recording and reproduction device 1, a laser diode 15, a front monitor 16, a photo detector 17, and a gain control circuit 18 are provided in the optical pickup OP.

As was clear from the previous description, the laser diode 15 emits light and is driven by the laser driver 13. In addition, the front monitor 16 is a photo detector which is provided for laser output power monitoring and the received light signal of the front monitor 16 is supplied to an APC circuit 19 in the diagram. The APC circuit 19 controls the laser driver 13 so that the power which is the laser output power specified by the system controller 10 (for example, write power and read power) is constant based on the received light signal from the front monitor 16.

In addition, the gain control circuit 18 performs gain control with regard to the received light signal using the photo detector 17.

Here, when performing the write operation, since the laser power increases compared to when reading, the amount of light returning to the photo diode 17 of course also increases. As a result, in order to prevent saturation of the A/D converter in the matrix circuit 4 at a later stage, gain adjustment is performed in the gain control circuit 18 so that the level is equal to when reading with regard to the received light signal using the photo diode 17 when writing.

Taking into consideration the assumption above, a specific example of the laser power control method during destructive recording will be described.

Figure 8:
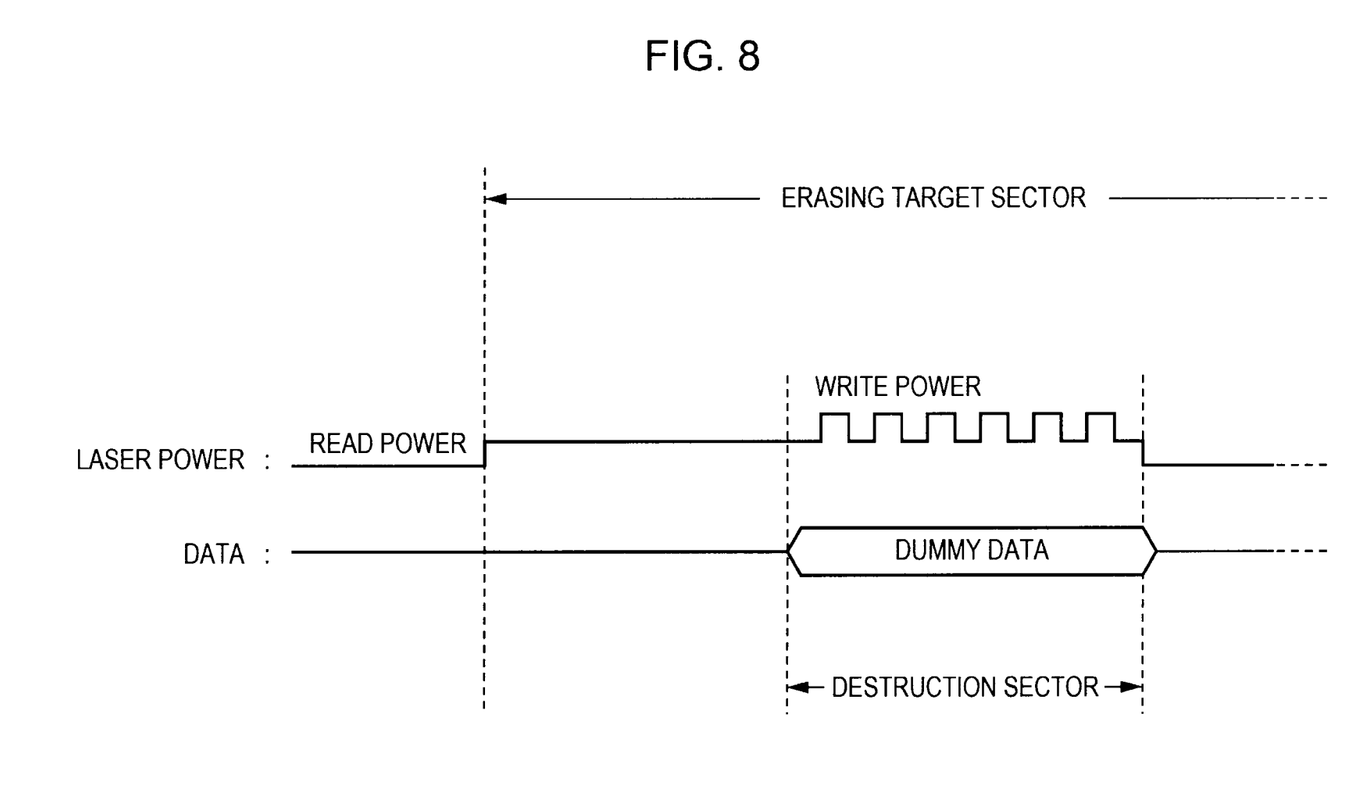
FIG. 8 is an explanatory diagram of an example of a laser power switching method.
Figure 9:
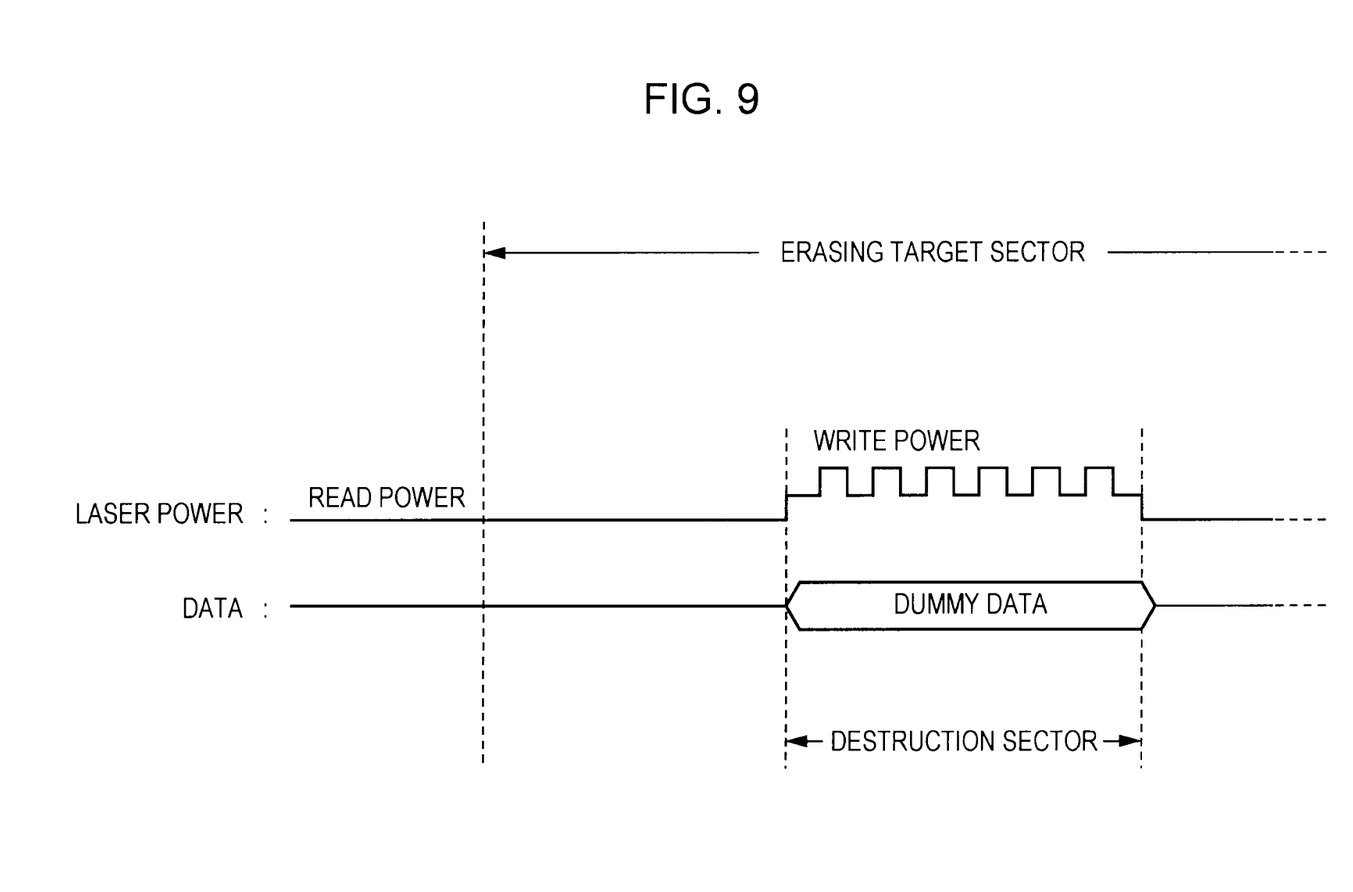
FIG. 9 is an explanatory diagram of another example of the laser power switching method.

As the laser power control method during destructive recording, it is sufficient if the APC responsiveness is considered and a method of any of FIG. 8 or 9 next is adopted.

FIG. 8 is an explanatory diagram of a laser power control method (switching method) to be adopted according to a case where APC responsiveness is not fast.

As shown in FIG. 8, in the case where the APC responsiveness is not fast, the laser power is switched to a predetermined power between a read power and a write power (a power which is larger than the read power to the extent that recording data destruction does not occur: referred to below as erase power) from the read power up until then in accordance with the erasing target sector being reached (the head of the first cluster in the erasing target sector being reached). Then, after that, by overlapping the recording pulse according to the destruction sector (destruction target sector) being reached, alternating of laser beam emission of the write power and the erase power is performed on the destruction sectors.

After the passing of the destruction sectors as diagrammatically shown, the laser power returns to the read power.

The operation such as this is repeatedly performed to each cluster in the erasing target sector.

In the case of adopting the power switching method shown in FIG. 8, switching of the gain in the gain control circuit 18 (that is, damping of the received light level during reading) is performed at the head of the clusters.

In addition, the APC in this case is executed by switching a target value to a value according to the erase power at the head of the clusters and adding the write power to the erase power when the data is "1" in the destruction sector.

Here, describing for confirmation, the system controller 10 performs the laser power switching command with regard to the laser driver 13 and the target value switching command with regard to the APC circuit 19. In addition, the system controller 10 also performs the gain switching command with regard to the gain control circuit 18.

By adopting the method such as that described in FIG. 8 corresponding to the case where the APC responsiveness is not fast, it is possible to achieve APC stability, and as a result, it is possible to achieve stability of the servo control and the like.

In addition, FIG. 9 is an explanatory diagram of a laser power control method (switching method) to be adopted according to a case where the APC responsiveness is relatively fast.

In the case where the APC responsiveness is relatively good as diagrammatically shown, the laser power is switched from the read power to the erase power according to the reaching of the destruction sector, and the light emission using the write power is performed so that the recording pulses overlap in the destruction sectors.

The gain switching command with regard to the gain control circuit 18 in this case is performed at the head of the destruction sectors.

In addition, with regard to the switching of the target value of the APC in this case, switching of the read power to the erase power is performed at the head of the destruction sectors, and in the destruction sectors, the erase power is performed in data "0" and the adding of the write power to the erase power is performed in data "1". Then, the target value according to the read power is switched according to the completion of the destruction sector.

In addition, in the description up until here, the disclosure has been exemplified as the case of being applied to a system which performs recording and reproduction with the BD which is a disk-shaped recording medium as a target. However, it is possible to widely and appropriately apply the disclosure with regard to systems which perform recording and/or reproduction with regard to recording media with disc shapes.

The present disclosure contains subject matter related to that disclosed in Japanese Priority Patent Application JP 2010-136424 filed in the Japan Patent Office on Jun. 15, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information erasing device comprising:
a recording section where recording is performed with regard to a disk-shaped recording medium; and
control circuitry configured to instruct the recording section to overwrite a part of an erasing target sector that does not overlap in a radius direction of the disk-shaped recording medium with another erasing target sector, wherein
the erasing target sector includes an error correction block,
in instructing the recording section to overwrite the part of the erasing target sector, the circuitry is configured to instruct the recording section to overwrite a part of the error correction block, and
when the erasing target sector is adjacent to an already erased sector, the circuitry is configured to include the already erased sector into the erasing target sector.

2. The information erasing device according to claim 1, wherein the circuitry is configured to control the recording section so that the recording section overwrites with dummy data.

3. The information erasing device according to claim 1, wherein the part of the erasing target sector has a sector length of such an extent that error correction is not possible.

4. The information erasing device according to claim 2, wherein the circuitry is configured to select the part of the erasing target sector from a plurality of sync patterns.

5. The information erasing device according to claim 4, wherein the circuitry is configured to select the part of the erasing target sector based on a random number.

6. The information erasing device according to claim 1, wherein the circuitry is configured to adjust a power of a laser beam, and control the power of the laser beam so as to switch to a predetermined power between a read power and a write power at a timing according to the head of the erasing target sector, and wherein the recording section records data on the disk-shaped recording medium by using a radiation of a laser beam.

7. An information erasing method comprising:

overwriting a part of an erasing target sector that does not overlap in a radius direction of the disk-shaped recording medium with another erasing target sector, wherein the erasing target sector includes an error correction block, overwriting the part of the erasing target sector includes overwriting a part of the error correction block, and when the erasing target sector is adjacent to an already erased sector, including the already erased sector into the erasing target sector.

8. The information erasing device according to claim 1, wherein only a length of the part of the error correction block is overwritten to the extent that an error correction code therein cannot be determined.

9. The information erasing device according to claim 1, wherein the length of the part of the error correction block that is overwritten is approximately 1 mm to 2 mm in a line direction.

* * * * *